(12) United States Patent
Shin et al.

(10) Patent No.: US 10,807,647 B2
(45) Date of Patent: Oct. 20, 2020

(54) VEHICLE BODY STRUCTURE

(71) Applicants: HYUNDAI MOTOR COMPANY, Seoul (KR); KIA MOTORS CORPORATION, Seoul (KR)

(72) Inventors: Seongsu Shin, Seoul (KR); Mincheol Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 67 days.

(21) Appl. No.: 16/353,216

(22) Filed: Mar. 14, 2019

(65) Prior Publication Data
US 2020/0180701 A1 Jun. 11, 2020

(30) Foreign Application Priority Data
Dec. 5, 2018 (KR) .................. 10-2018-0154970

(51) Int. Cl.
*B62D 21/15* (2006.01)
*B60R 19/34* (2006.01)
*B62D 25/20* (2006.01)

(52) U.S. Cl.
CPC ............ *B62D 21/155* (2013.01); *B60R 19/34* (2013.01); *B62D 25/2027* (2013.01)

(58) Field of Classification Search
CPC ......... B60R 19/12; B60R 19/18; B60R 19/02; B60R 2021/0011; B60R 19/00; B60R 19/22; B60R 19/24; B60R 19/34; B60R 2019/1873; B60R 19/48; B62D 21/152; B62D 25/087; B62D 25/08; B62D 43/10; B62D 25/2027; B62D 21/11; B62D 21/15; B62D 25/02; B62D 21/155; B62D 21/157

(Continued)

(56) References Cited

U.S. PATENT DOCUMENTS 6,588,832 B2 * 7/2003 Sakuma ............... B62D 21/152
296/203.01
7,905,503 B2 * 3/2011 Goto .................... B62D 25/087
280/124.109

(Continued)

FOREIGN PATENT DOCUMENTS

JP 2000-168614 A 6/2000
JP 2003-026049 A 1/2003
(Continued)

*Primary Examiner* — D Glenn Dayoan
*Assistant Examiner* — Sunsurraye Westbrook
(74) *Attorney, Agent, or Firm* — Brinks Gilson & Lione

(57) ABSTRACT

A vehicle body structure may include: two first rear side members respectively provided on opposite sides of a rear floor; a rear sub-frame including a front cross member and a rear cross member spaced apart from each other, where opposite ends of the front cross member and opposite ends of the rear cross member are coupled to two of the first rear side members, respectively; a vehicle body cross member which is spaced rearward from the rear sub-frame, connected to the first rear side members, and fixed to the rear floor; two second rear side members provided between two of the first rear side members, and arranged side by side with each of two of the first rear side members; and two truss members each extending from first connecting portions to second connecting portions, respectively.

8 Claims, 7 Drawing Sheets

(58) Field of Classification Search
USPC ... 296/187.11, 203.04, 37.2, 187.09, 187.03,
296/37.16, 30; 293/133, 102, 109, 120,
293/148, 107, 118, 119, 121; 280/784,
280/781, 504, 782, 785
See application file for complete search history.

(56) References Cited

U.S. PATENT DOCUMENTS

| | | | |
|---|---|---|---|
| 8,857,836 B2 * | 10/2014 | Okuyama | B60G 3/20 280/124.109 |
| 9,604,672 B2 * | 3/2017 | Kaneko | B62D 25/2027 |
| 2015/0217810 A1 * | 8/2015 | Terada | B60K 15/063 280/783 |

FOREIGN PATENT DOCUMENTS

| | | |
|---|---|---|
| JP | 2005-104253 A | 4/2005 |
| KR | 10-0578568 B1 | 5/2006 |
| KR | 10-2008-0016090 A | 2/2008 |
| KR | 10-1664049 B1 | 10/2016 |

\* cited by examiner

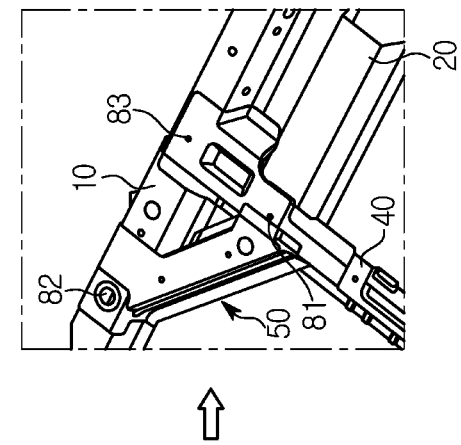
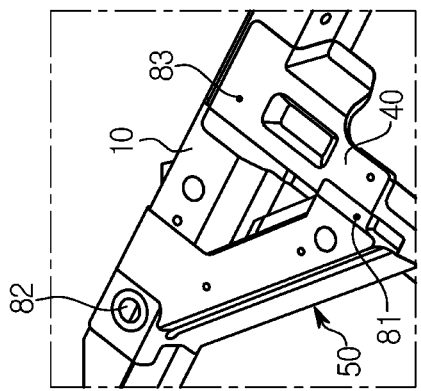
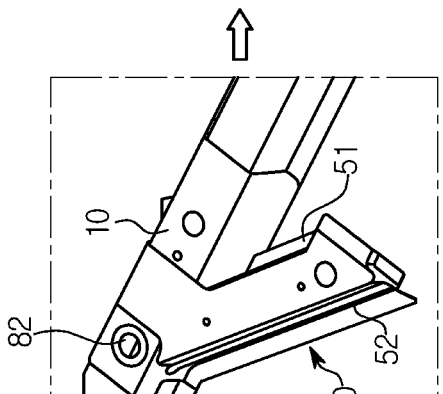
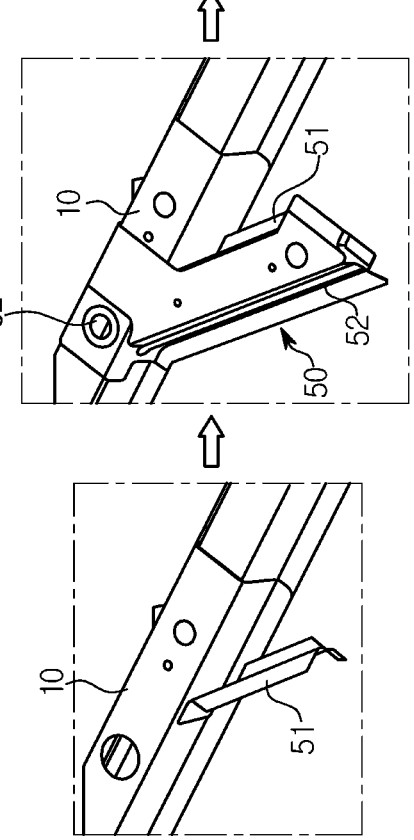

VEHICLE BODY STRUCTURE

CROSS-REFERENCE TO RELATED APPLICATION

This application claims priority to and the benefit of Korean Patent Application No. 10-2018-0154970, filed on Dec. 5, 2018, the entire contents of which are incorporated herein by reference.

FIELD

The present disclosure relates to a vehicle body structure for effectively dispersing a collision load of the vehicle.

BACKGROUND

The statements in this section merely provide background information related to the present disclosure and may not constitute prior art.

Hybrid electric vehicles (HEVs) and plug-in hybrid electric vehicles (PHEVs) have a fuel tank and high-voltage battery components for drive systems. The fuel tank and high voltage battery components are mounted on a rear floor of a vehicle body structure.

In such vehicles, since the fuel tank and the high-voltage battery components are installed on the rear floor, loads acting on the rear floor and rear side members increase. In addition, in such vehicles, a crumple zone of the collision energy for rearward collision decreases accordingly.

The vehicle body structure of such vehicles uses a similar form to the structure of a conventional internal combustion engine vehicle to protect rear components such as a fuel tank, a high-voltage battery, and the like, and at the same time includes collision reinforcement members installed inside the rear side members to enhance rigidity against rearward collision.

However, we have discovered that since the collision reinforcement members are locally excessively applied to the vehicle body structure of such vehicles, there is a problem that the manufacturing cost and the weight increase. In addition, although the rigidity of the rear side members is high because the collision reinforcement members are installed inside the rear side members, the rigidity of the regions where the rear side members are not located (e.g., a rear center portion, etc.) is low. Therefore, we found that it is difficult to protect the components mounted on the rear floor when a collision load is applied to the regions where the rear side members are not located.

SUMMARY

The present disclosure provides a vehicle body structure capable of stably protecting components mounted on a rear floor by effectively dispersing a collision load from a rear side of the vehicle.

Additional aspects of the present disclosure will be set forth in part in the description which follows and, in part, will be obvious from the description, or may be learned by practice of the present disclosure.

In accordance with an aspect of the present disclosure, a vehicle body structure defining a longitudinal direction, the vehicle body structure may include: two first rear side members provided on opposite sides of a rear floor and configured to respectively extend in the longitudinal direction; a rear sub-frame including a front cross member and a rear cross member spaced apart from each other, wherein opposite ends of the front cross member are respectively coupled to a corresponding first rear side member among the two first rear side members, and opposite ends of the rear cross member are respectively coupled to the corresponding first rear side member among the two the first rear side members; a vehicle body cross member spaced apart from the rear sub-frame and fixed to the rear floor, wherein opposite ends of the vehicle body cross member are respectively connected to the corresponding the first rear side member among the two first rear side members; two second rear side members provided between the two first rear side members on the rear floor, and arranged side by side with each of the two first rear side members so as to be spaced apart from each other, wherein the two second rear side members respectively extend from a rear end of the rear floor to the vehicle body cross member, and wherein the vehicle body cross member and the two second rear side members are respectively connected to each other at first connecting portions, and opposite ends of the rear cross member and the two first rear side members are respectively connected to each other at second connecting portions; and two truss members respectively extending from the first connecting portions to the second connecting portions.

The first connecting portions, the second connecting portions, and third connecting portions are arranged in a triangular shape, wherein the opposite ends of the vehicle body cross member are connected to the first rear side members at the third connecting portions.

The rear cross member of the rear sub-frame may include an intermediate extending portion extending in a vehicle width direction, and two lateral extending portions respectively extending obliquely rearward from opposite ends of the intermediate extending portion to be connected to the second connecting portions.

A lateral load applied to the second connecting portions from a side of the vehicle may be dispersed and transmitted to the corresponding lateral extending portion and the truss members.

A longitudinal load applied to the first rear side members from the rear of the vehicle may be dispersed and transmitted from the third connecting portions to the second connecting portions and the first connecting portions, and a longitudinal load applied to the second rear side members from the rear of the vehicle may be dispersed and transmitted from the first connecting portions to the opposite ends of the vehicle body cross member and the corresponding truss member.

The vehicle body structure may further include first crush boxes connecting rear ends of two of the first rear side members and a rear bumper structure.

The vehicle body structure may further include second crush boxes connecting rear ends of two of the second rear side members and the rear bumper structure.

The truss member may include an outer member connecting the corresponding first connecting portion and the corresponding second connecting portion, and an inner member provided inside the outer member to reinforce rigidity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6:
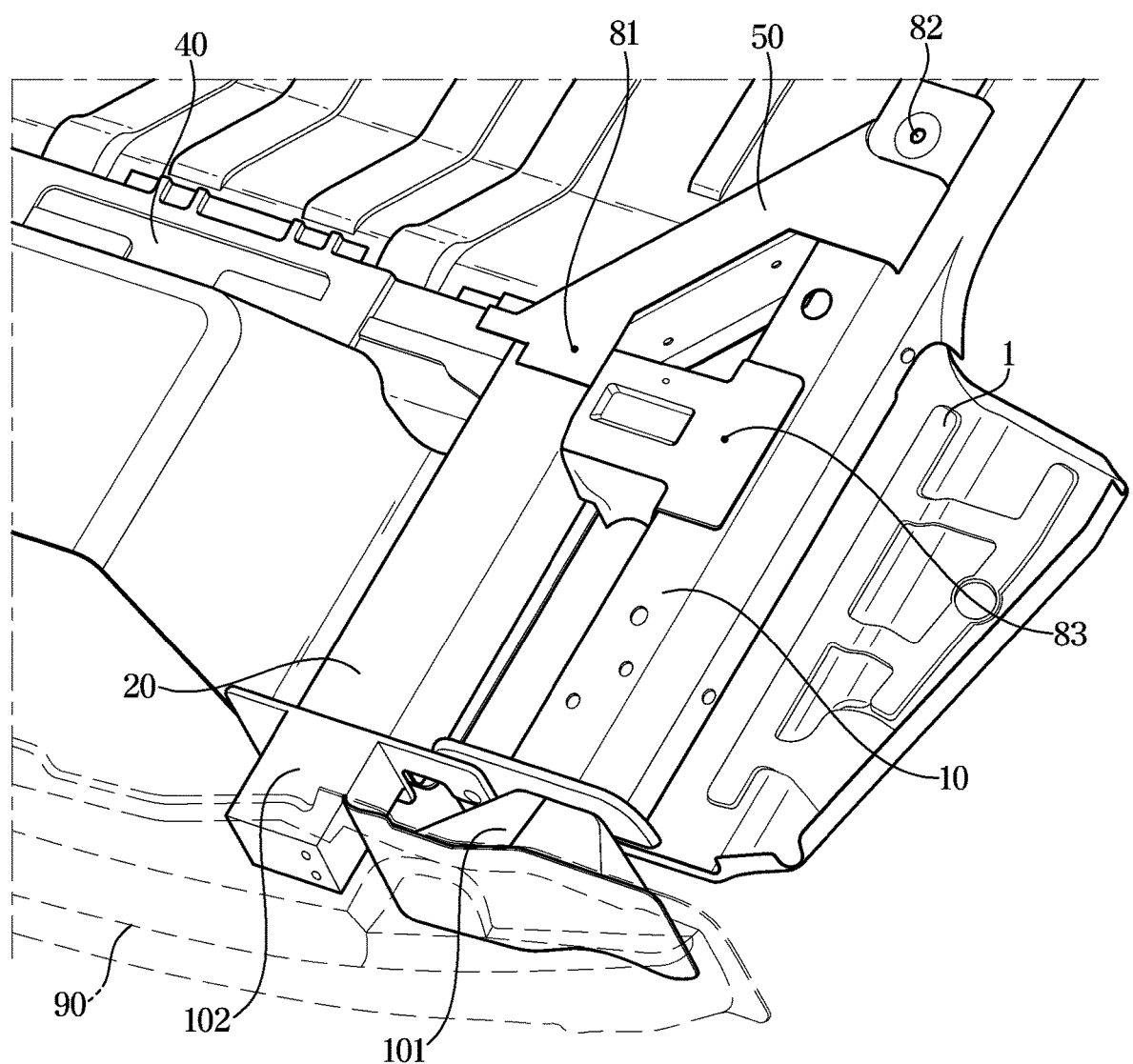

FIG. 6 is a perspective view illustrating an example in which first and second rear side members and a rear bumper structure of a vehicle body structure are connected by first and second crush boxes according to one form of the present disclosure; and FIGS. 7A to 7D illustrate a configuration of a truss member mounted on a vehicle body structure and processes of installing the truss member according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The following forms are provided to fully convey the spirit of the present disclosure to a person having ordinary skill in the art to which the present disclosure belongs, and the present disclosure is not limited thereto, but may be embodied in other forms. In order to clarify the present disclosure, it is possible to omit the parts of the drawings that are not related to the description, and the size of the components may be slightly exaggerated to facilitate understanding.

Figure 1:
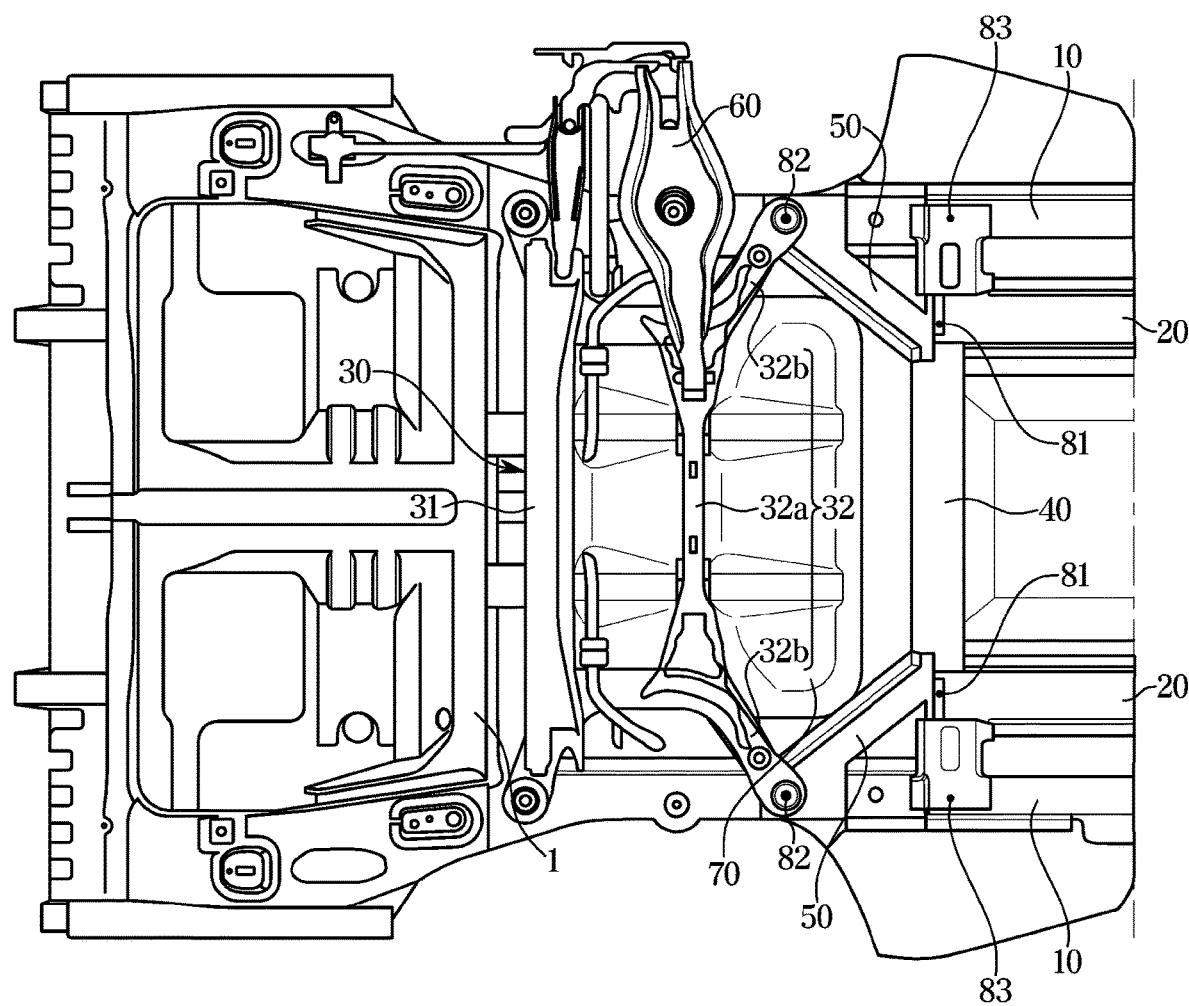
FIG. 1 is a plan view of a vehicle body structure in one form of the present disclosure.
Figure 2:
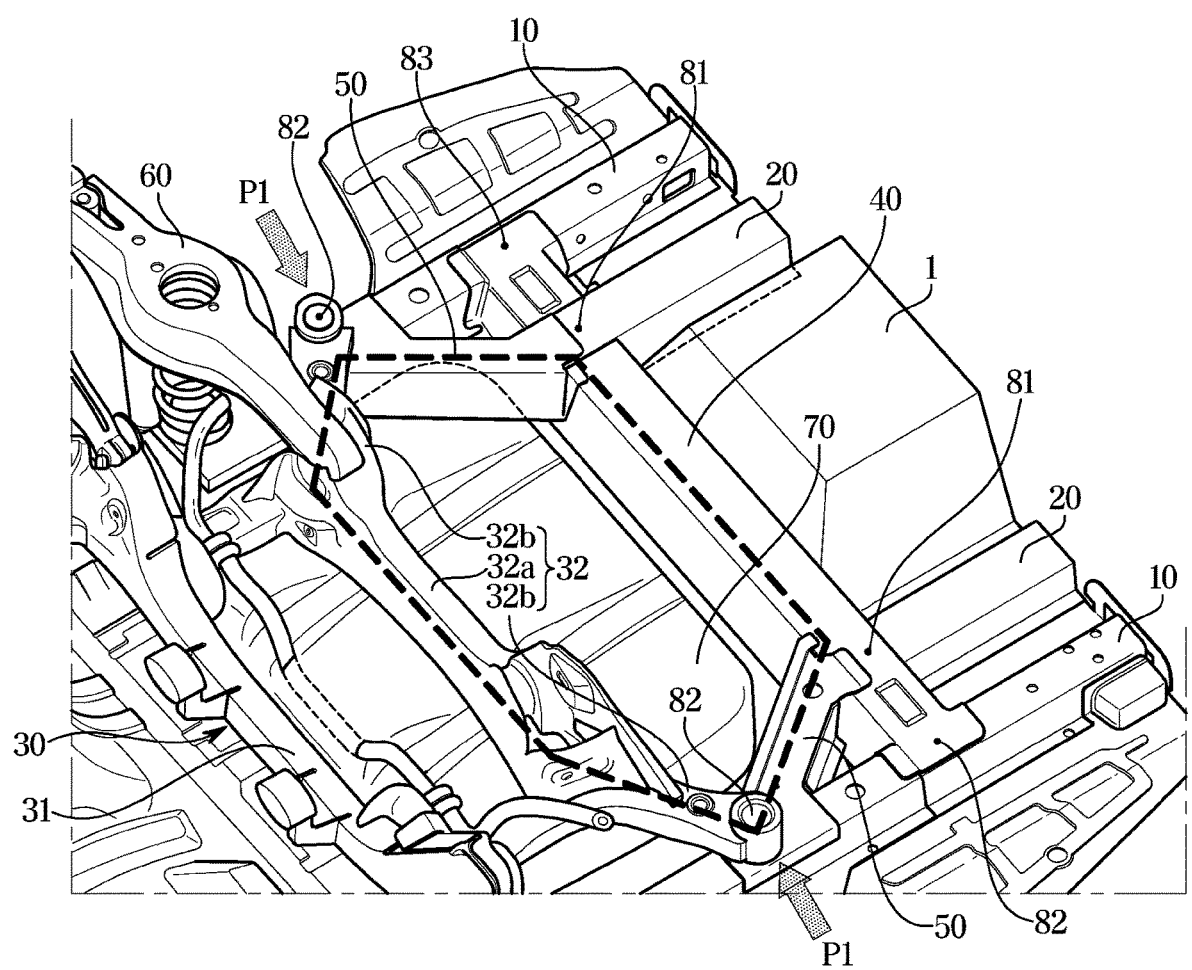
FIG. 2 is a perspective view of a vehicle body structure according to another form of the present disclosure.

As illustrated in FIGS. 1 and 2, a vehicle body structure according to one form of the present disclosure includes: two first rear side members 10, two second rear side members 20, a rear sub-frame 30, a vehicle body cross member 40, and two truss members 50.

The two first rear side members 10 are provided on opposite sides of a rear floor 1 so as to extend in a longitudinal direction, respectively. Opposite ends of the rear sub-frame 30 are respectively coupled to the corresponding first rear side member among the two first rear side members 10 so as to reinforce the rigidity of rear suspension mounting portions 60 provided on the opposite sides of the rear floor 1.

The rear sub-frame 30 includes a front cross member 31 and a rear cross member 32 spaced apart from each other in a front-rear direction. Opposite ends of the front cross member 31 are respectively coupled to the two first rear side members 10, and opposite ends of the rear cross member 32 are coupled to two of the first rear side members 10, respectively. The rear sub-frame 30 may reinforce a lateral rigidity of the rear floor 1 to protect components such as a fuel tank 70 and a battery (not shown) mounted on the rear floor 1.

The vehicle body cross member 40 is spaced apart from the rear sub-frame 30 in a rearward direction by a predetermined distance, and opposite ends of the vehicle body cross member 40 are connected to two of the first rear side members 10, respectively. The vehicle body cross member 40 is not only fixed to the rear floor 1 in an integrated form so as to reinforce the lateral rigidity of the rear floor 1 together with the rear sub-frame 30, but also serves to protect the fuel tank 70, the battery, and the like, which are mounted on the front of the vehicle body cross member 40, from rearward collision.

Two of the second rear side members 20 are provided between two of the first rear side members 10 at the rear of the vehicle body cross member 40, and each of two of the second rear side members 20 is arranged side by side (almost in parallel) with each of two of the first rear side members 10 so as to be laterally spaced apart from each other. Each of the second rear side members 20 extends from the rear end of the rear floor 1 to the vehicle body cross member 40 and is fixed to the rear floor 1 in an integrated state.

In one form, as illustrated in FIG. 1, the two truss members 50 are respectively extended from first connection portions 81 to second connecting portions 82. At the first connecting portions 81, the vehicle body cross member 40 and two of the second rear side members 20 are connected, and opposite ends of the rear cross member 32 and the two first rear side members 10 are connected to each other at the corresponding second connecting portions 82.

Figure 3:
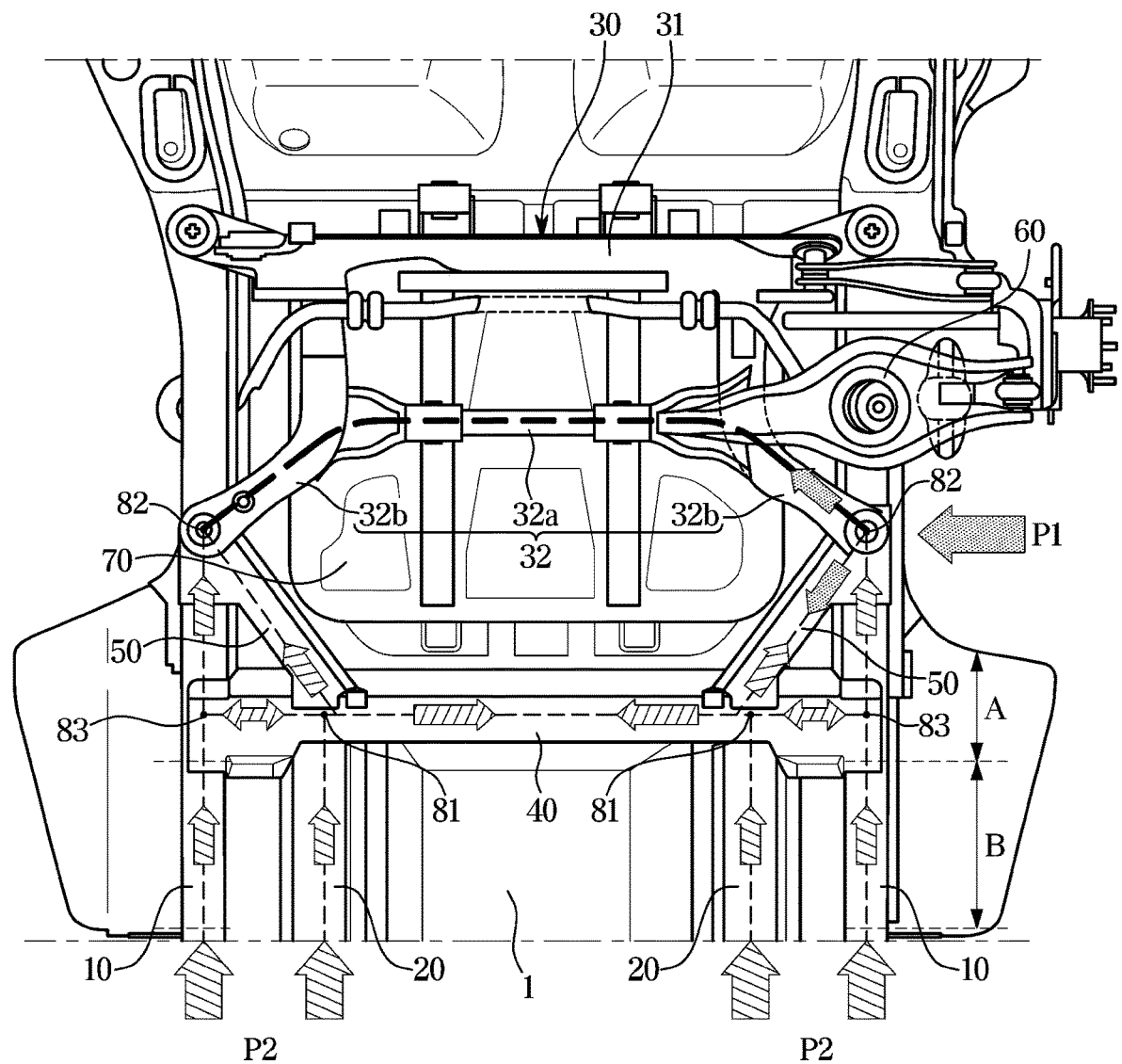
FIG. 3 is a plan view of a vehicle body structure in one form of the present disclosure, illustrating a state in which a collision load is dispersed and transmitted to the rear and sides of the vehicle.

In another form, as illustrated in FIG. 3, the vehicle body structure is configured that the first connecting portions 81, the second connecting portions 82, and third connecting portions 83 are arranged in a triangular shape. At the third connecting portions 83, the opposite ends of the vehicle body cross member 40 and the first rear side members 10 are connected. Such vehicle body structure may reinforce the lateral and longitudinal rigidity of a front region A (fuel tank mounting region) of the vehicle body cross member 40. In addition, the vehicle body structure may safely protect the front region A of the vehicle body cross member 40 of the rear floor 1 against collision by dispersing a lateral load P1 and a longitudinal load P2 applied from a rear side.

Referring to FIGS. 1 to 3, the rear cross member 32 of the rear sub-frame 30 includes an intermediate extending portion 32a extending in a vehicle width direction, and two of lateral extending portions 32b extending obliquely rearward from opposite ends of the intermediate extending portion 32a to be connected to the second connecting portions 82.

As illustrated in FIG. 3, the lateral load P1 applied to the second connecting portions 82 from a side of the vehicle may be dispersed and transmitted to the lateral extending portions 32b and the truss members 50. A part of the lateral load P1 is transmitted to the rear sub-frame 30 through the lateral extending portions 32b and the other part of the lateral load P1 is transmitted to the vehicle body cross member 40 through the truss members 50. The lateral load P1 is widely dispersed and transmitted to the rear side of the rear floor 1 through the truss members 50 and the vehicle body cross member 40 as well as the rear sub-frame 30. Thus, the vehicle body structure may safely protect the front region A of the body cross member 40 from lateral collision.

Figure 4:
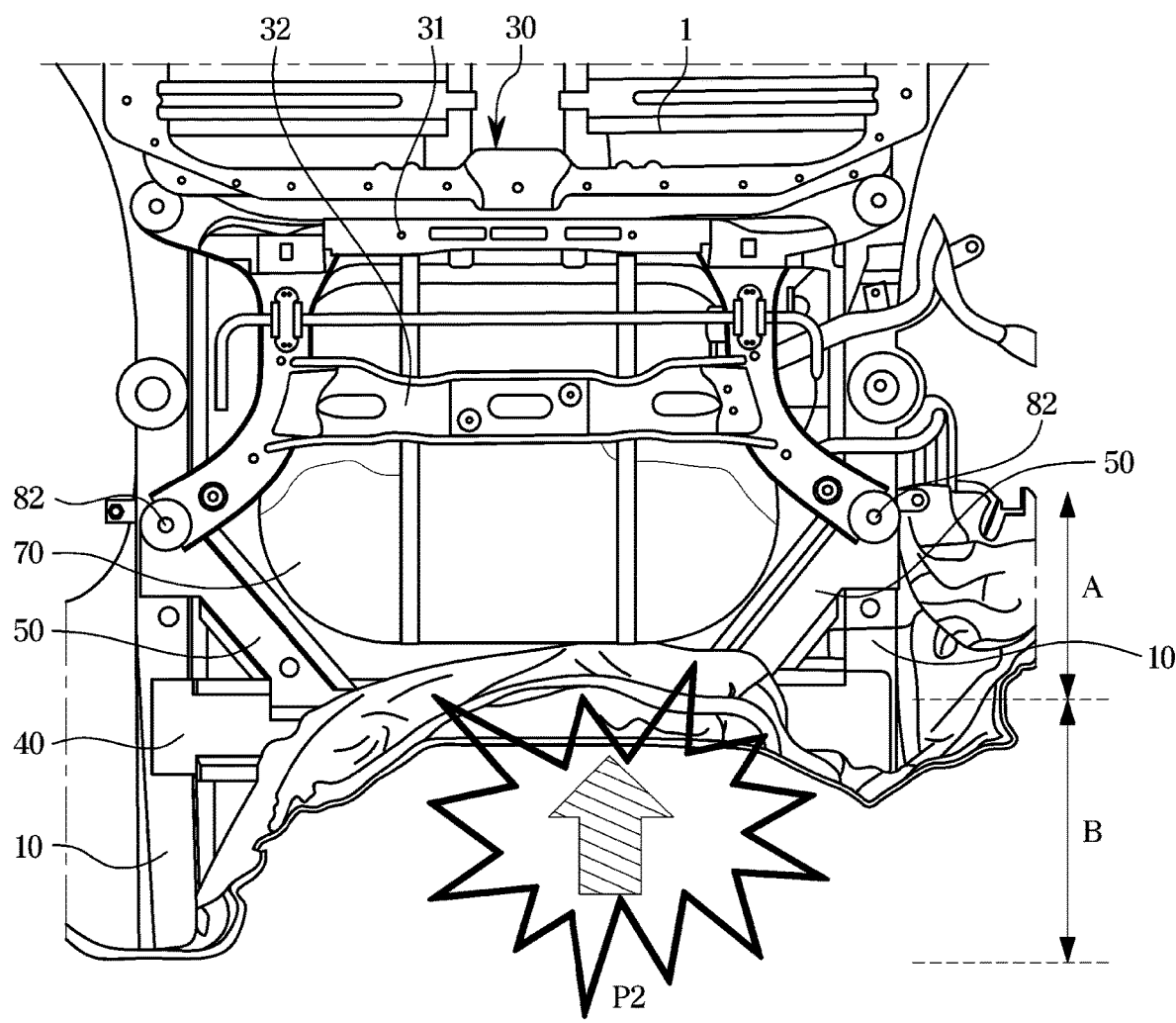
FIG. 4 is a plan view of a vehicle body structure according to one form of the present disclosure, illustrating a state in which a fuel tank is protected on rearward collision.

As illustrated in FIG. 3, in the vehicle body structure, the longitudinal load P2 applied to the first rear side members 10 from the rear of the vehicle is dispersed and transmitted from the third connecting portions 83 to the second connecting portions 82 side and the first connecting portions 81 side, and the longitudinal load P2 applied to the second rear side members 20 from the rear of the vehicle is dispersed and transmitted from the first connecting portions 81 to the opposite ends of the vehicle body cross member 40 side and the truss members 50 side. Accordingly, as illustrated in FIG. 4, the vehicle body structure may safely protect the front region A (fuel tank installation region) of the vehicle body cross member 40 even when a collision occurs from the rear of the vehicle.

In addition, the vehicle body structure according to the present form may significantly reinforce the rigidity against collision at a rear intermediate portion than in the prior art because the vehicle body structure includes two of the first rear side members 10 and two of the second rear side members 20, and may safely protect the front region A of the vehicle body cross member 40 because the first rear side members 10 and the second rear side members 20 share the load P2 applied from the rear of the vehicle. That is, as illustrated in FIGS. 3 and 4, when the rear collision occurs, a rear region B of the vehicle body cross member 40 is deformed to absorb the impact, but the front region A of the vehicle body cross member 40 may be maintained without deformation because the load is evenly dispersed.

Figure 5:
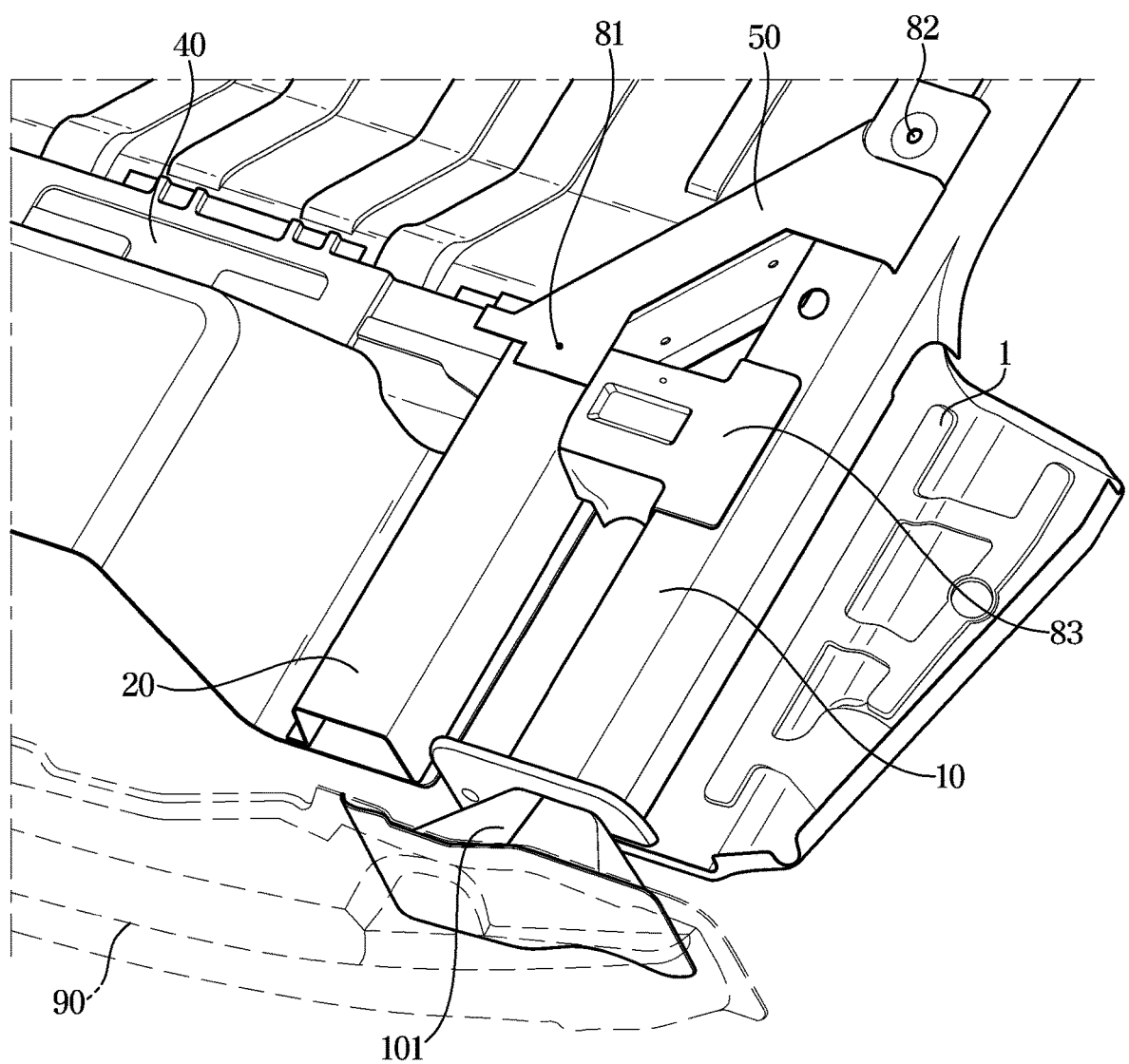
FIG. 5 is a perspective view illustrating an example in which first rear side members and a rear bumper structure of a vehicle body structure are connected by a first crush box according to an exemplary form of the present disclosure.

Referring to FIG. 5, a rear bumper structure 90 may be connected to the rear ends of two of the first rear side members 10 by first crush boxes 101 for absorbing the impact, but as illustrated in FIG. 6, second crush boxes 102 connecting the rear ends of two of the second rear side members 20 and the rear bumper structure 90 may be additionally provided.

When the first crush boxes 101 and the second crush box 102 are installed together as in the example of FIG. 6, it is possible to further increase the impact damping effect on the rear collision, it is possible to increase the tuning freedom of the crush boxes, and it is possible that the crush boxes are made of thin material. In addition, the coupling stability of the rear bumper structure 90 may also be reinforced.

FIGS. 7A to 7D illustrate a configuration of the truss member 50 and processes of installing the truss member 50. The truss member 50 may include an outer member 52 connecting the first connecting portion 81 and the second connecting portion 82, and an inner member 51 provided inside the outer member 52 to reinforce rigidity.

When the truss member 50 is installed, as in FIG. 7A, one end of the inner member 51 may be connected to the first rear side member 10, and as in FIG. 7B, the outer member 52 may be mounted on an outer side of the inner member 51. After the outer member 52 is installed, as in FIG. 7C, the vehicle body cross member 40 and one end of the truss member 50 may be connected while the vehicle body cross member 40 is installed, and as in FIG. 7D, the second rear side member 20 may be connected to the first connecting portion 81 to which the vehicle body cross member 40 and the truss member 50 are connected while the second rear side member 20 is installed.

As is apparent from the above, the vehicle body structure according to the exemplary forms of the present disclosure can safely protect the front region of the vehicle body cross member on which the fuel tank, the battery, and the like are installed from a lateral collision because a lateral load is widely dispersed and transmitted not only through the rear sub-frame but also through the truss members and the vehicle body cross member.

In addition, the vehicle body structure according to the forms of the present disclosure can significantly reinforce the rigidity against collision at a rear intermediate portion than in the prior art because the vehicle body structure includes two of the first rear side members and two of the second rear side members, and can safely protect the front region of the vehicle body cross member from a rear collision because the first rear side members and the second rear side members share the load applied from the rear of the vehicle and the longitudinal load applied to the second rear side members is dispersed and transmitted to the vehicle body cross member and the truss members.

What is claimed is:

1. A vehicle body structure defining a longitudinal direction, the vehicle body structure comprising:
    two first rear side members provided on opposite sides of a rear floor and configured to respectively extend in the longitudinal direction;
    a rear sub-frame including a front cross member and a rear cross member spaced apart from each other, wherein opposite ends of the front cross member are respectively coupled to a corresponding first rear side member among the two first rear side members, and opposite ends of the rear cross member are respectively coupled to the corresponding first rear side member among the two first rear side members;
    a vehicle body cross member being spaced apart from the rear sub-frame and fixed to the rear floor, wherein opposite ends of the vehicle body cross member are respectively connected to the corresponding first rear side member among the two first rear side members;
    two second rear side members provided between the two first rear side members on the rear floor, and arranged side by side with each of the two first rear side members so as to be spaced apart from each other, wherein the two second rear side members respectively extend from a rear end of the rear floor to the vehicle body cross member, and wherein the vehicle body cross member and the two second rear side members are respectively connected to each other at first connecting portions, and opposite ends of the rear cross member and the two first rear side members are respectively connected to each other at second connecting portions; and
    two truss members respectively extending from the first connecting portions to the second connection portions.

2. The vehicle body structure according to claim 1, wherein:
    the first connecting portions, the second connecting portions, and third connecting portions are arranged in a triangular shape, wherein the opposite ends of the vehicle body cross member are connected to the first rear side members at the third connecting portions.

3. The vehicle body structure according to claim 2, wherein:
    the rear cross member of the rear sub-frame includes an intermediate extending portion extending in a vehicle width direction, and two lateral extending portions respectively extending obliquely rearward from opposite ends of the intermediate extending portion to be connected to the second connecting portions.

4. The vehicle body structure according to claim 3, wherein:
    a lateral load applied to the second connecting portions from a side of the vehicle is dispersed and transmitted to the corresponding lateral extending portion and the truss member.

5. The vehicle body structure according to claim 2, wherein:
    a longitudinal load applied to the first rear side members from the rear of the vehicle is dispersed and transmitted from the third connecting portions to the second connecting portions and the first connecting portions, and a longitudinal load applied to the second rear side members from the rear of the vehicle is dispersed and transmitted from the first connecting portions to the opposite ends of the vehicle body cross member and the corresponding truss member.

6. The vehicle body structure according to claim 1, further comprising:
   first crush boxes connecting rear ends of two of the first rear side members and a rear bumper structure.

7. The vehicle body structure according to claim 6, further comprising:
   second crush boxes connecting rear ends of two of the second rear side members and the rear bumper structure.

8. The vehicle body structure according to claim 1, wherein:
   the truss member includes an outer member connecting the corresponding first connecting portion and the corresponding second connecting portion, and an inner member provided inside the outer member to reinforce rigidity.

\* \* \* \* \*